(12) United States Patent
Kimoto

(10) Patent No.: US 8,780,270 B2
(45) Date of Patent: Jul. 15, 2014

(54) VIDEO DISPLAY APPARATUS, VIDEO OUTPUT APPARATUS, CONTROL METHODS THEREOF, AND VIDEO DISPLAY SYSYEM

(71) Applicant: Canon Kabushiki Kaisha, Tokyo (JP)

(72) Inventor: Tatsuya Kimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/024,082

(22) Filed: Sep. 11, 2013

(65) Prior Publication Data
US 2014/0009678 A1    Jan. 9, 2014

(30) Foreign Application Priority Data

Apr. 8, 2011  (JP) ................................. 2011-086753
Mar. 1, 2012  (JP) ................................. 2012-045787

(51) Int. Cl.
*H04N 5/04*     (2006.01)
*H04N 9/44*     (2006.01)
*H04N 7/01*     (2006.01)
*H04N 11/02*    (2006.01)

(52) U.S. Cl.
USPC ............ 348/501; 348/441; 348/445; 348/500

(58) Field of Classification Search
USPC .................................. 348/441, 445, 500, 501
See application file for complete search history.

(56) References Cited

U.S. PATENT DOCUMENTS

| 6,223,283 B1 * | 4/2001 | Chaiken et al. .................... 713/1 |
| 2005/0128349 A1 * | 6/2005 | Takamori et al. ............. 348/441 |
| 2008/0151119 A1 * | 6/2008 | Suzuki .......................... 348/569 |

* cited by examiner

*Primary Examiner* — Jefferey Harold
*Assistant Examiner* — Michael Teitelbaum
(74) *Attorney, Agent, or Firm* — Cowan, Liebowitz & Latman, P.C.

(57) ABSTRACT

Compatible video signal information having first information indicating a pixel number of a video signal displayable by a video display apparatus and second information that is setting information required in order for the video display apparatus to display a video signal having the pixel number is transmitted to a video output apparatus. In the case where a video signal received from the video output apparatus after the compatible video signal information is transmitted is a video signal having a pixel number displayable by the video display apparatus but not being displayable, the compatible video signal information is updated so that setting information for the pixel number of that video signal is included in the second information.

16 Claims, 7 Drawing Sheets

F I G. 2B

| | Description | Format |
|---|---|---|
| Established Timing | Established Timings 1 | 640x480@60Hz, 800x600@60Hz,··· |
| | Established Timings 2 | 1024x768@60Hz,··· |
| | Manufacturer's Reserved Timings | ··· |
| Standard Timing | Standard Timing Identification #1 | INFORMATION CORRESPONDING TO 1920x1200@60Hz |
| | Standard Timing Identification #2 | ··· |
| | Standard Timing Identification #3 | ··· |
| | Standard Timing Identification #4 | ··· |
| | Standard Timing Identification #5 | ··· |
| | Standard Timing Identification #6 | ··· |
| | Standard Timing Identification #7 | ··· |
| | Standard Timing Identification #8 | ··· |
| Detailed Timing #1 | Pixel Clock | DETAIL INFORMATION CORRESPONDING TO 2048x1536@60Hz |
| | H Active/Blanking | |
| | V Active/Blanking | |
| | H/V Sync Offset/Pulse Width | |
| | Image Size | |
| | Border | |
| | Flags | |
| Detailed Timing #2 | Pixel Clock | DETAIL INFORMATION CORRESPONDING TO 1920x1080@60Hz |
| | H Active/Blanking | |
| | V Active/Blanking | |
| | H/V Sync Offset/Pulse Width | |
| | Image Size | |
| | Border | |
| | Flags | |

FIG. 2C

| | Description | Format |
|---|---|---|
| Established Timing | Established Timings 1 | 640x480@60Hz, 800x600@60Hz,··· |
| | Established Timings 2 | 1024x768@60Hz,··· |
| | Manufacturer's Reserved Timings | ··· |
| Standard Timing | Standard Timing Identification #1 | INFORMATION CORRESPONDING TO 1920x1080@60Hz |
| | Standard Timing Identification #2 | ··· |
| | Standard Timing Identification #3 | ··· |
| | Standard Timing Identification #4 | ··· |
| | Standard Timing Identification #5 | ··· |
| | Standard Timing Identification #6 | ··· |
| | Standard Timing Identification #7 | ··· |
| | Standard Timing Identification #8 | ··· |
| Detailed Timing #1 | Pixel Clock | DETAIL INFORMATION CORRESPONDING TO 2048x1536@60Hz |
| | H Active/Blanking | |
| | V Active/Blanking | |
| | H/V Sync Offset/Pulse Width | |
| | Image Size | |
| | Border | |
| | Flags | |
| Detailed Timing #2 | Pixel Clock | DETAIL INFORMATION CORRESPONDING TO 1920x1200@60Hz |
| | H Active/Blanking | |
| | V Active/Blanking | |
| | H/V Sync Offset/Pulse Width | |
| | Image Size | |
| | Border | |
| | Flags | |

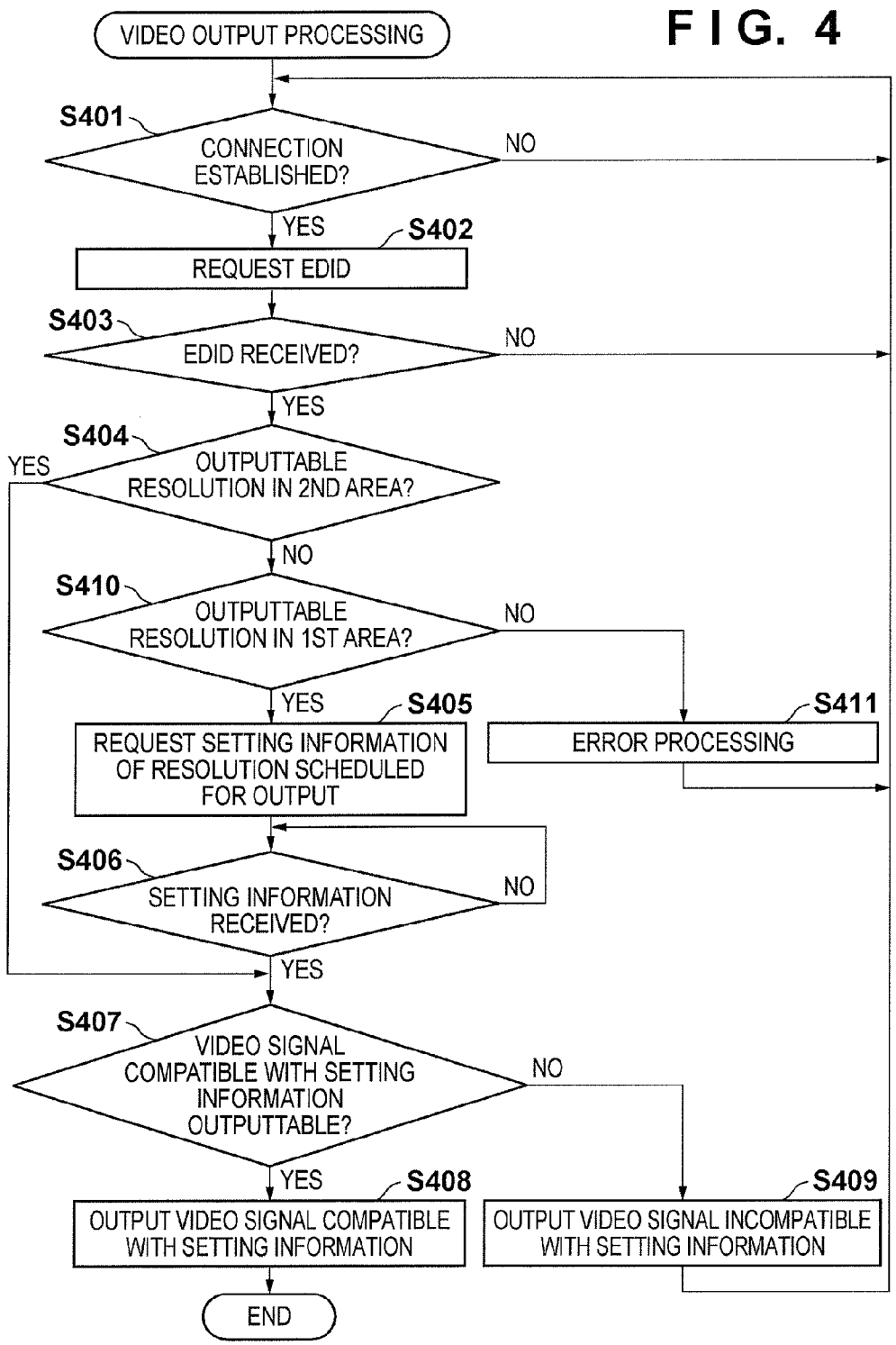

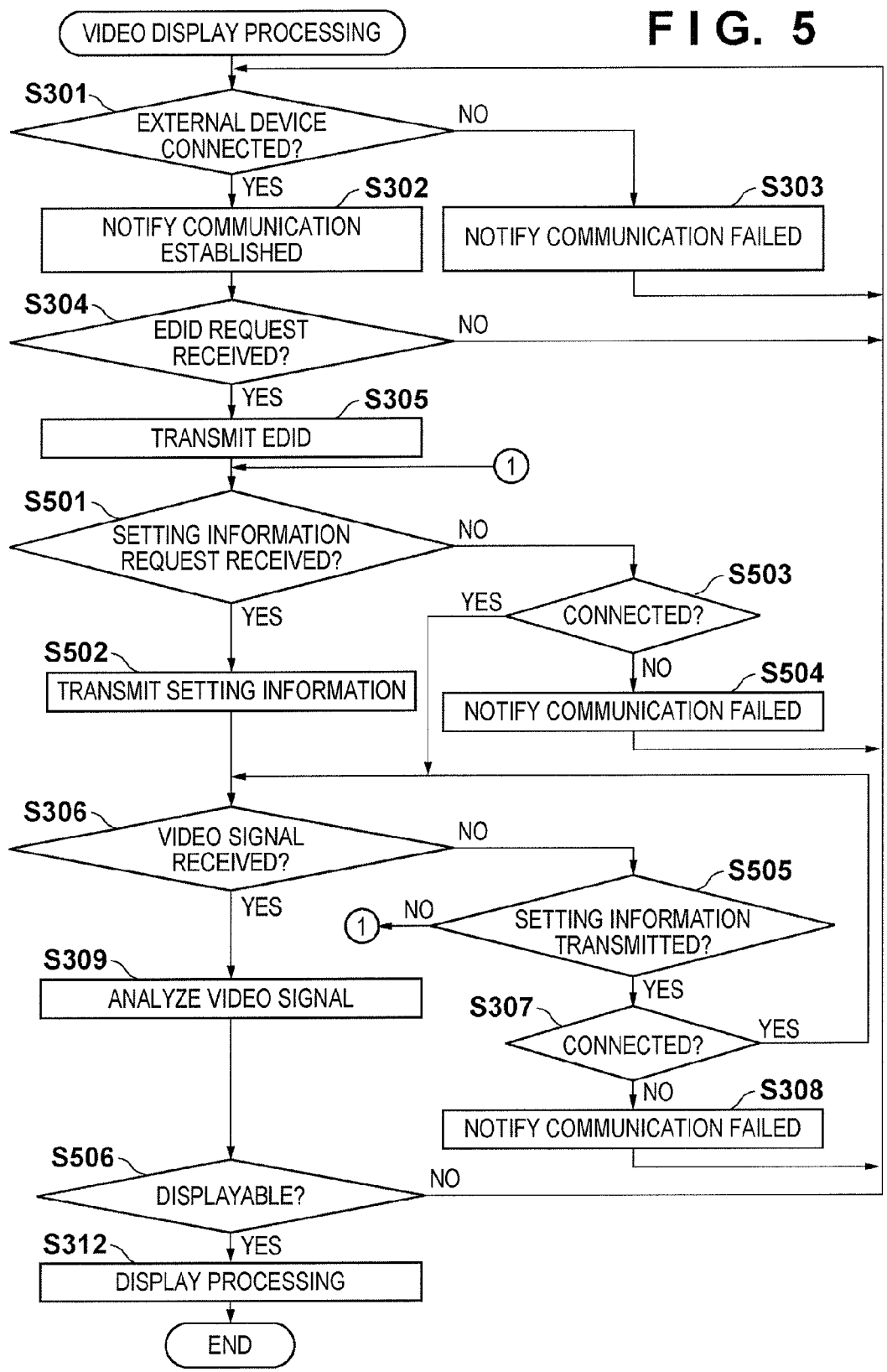

VIDEO DISPLAY APPARATUS, VIDEO OUTPUT APPARATUS, CONTROL METHODS THEREOF, AND VIDEO DISPLAY SYSYEM

CROSS-REFERENCE TO RELATED APPLICATIONS

This application is a divisional of application Ser. No. 13/433,954, filed Mar. 29, 2012 the entire disclosure of which is hereby incorporated by reference.

BACKGROUND OF THE INVENTION

1. Field of the Invention

The present invention relates to video display technology.

2. Description of the Related Art

The popularization of video display apparatuses such as TV receivers in recent years has led to the advent of video display apparatuses having various resolutions (pixel counts) for the display region. There are also video display apparatuses that differ in the type of video signal that can be displayed despite having the same resolution. This is due to information on displayable video signals such as vertical scanning frequency, effective pixels and blanking period being set on a per video display apparatus basis.

Identification information (compatible video signal information) of displayable video signals including resolution, vertical scanning frequency, effective pixels and blanking period is typically stored in respective storage areas of the video display apparatuses. For example, the Digital Visual Interface (DVI) standard defines a source apparatus (video output apparatus) and a sync device (video display apparatus), with compatible video signal information being included in Extended Display Identification Data (EDID) on the sync device side. The source apparatus, by obtaining EDID from the sync device, can ascertain the video signals that are displayable by the sync device. That is, in order to ensure that video signals compatible with the video display apparatus are output from the video output apparatus, such information on compatible video signals needs to be transmitted to the video output apparatus.

However, while displayable video signals differ depending on factors such as resolution and settings even with the same video display apparatus, not all combinations can be included in the compatible video signal information in view of the storage area, and description is divided into detailed description of a prescribed number of video signals and simplified description of resolutions, frequencies and the like. If a video signal that is not described in the detailed video signal setting information needs to be received due to a change in video display apparatus settings or the like, detailed video signal setting information is generated and rewritten, using corresponding information included as the simplified video signal description. In the case of generating detailed video signal setting information from information included as simplified video signal description, information such as pixel clock and blanking period is generated using a prescribed calculation formula set in a standard.

For example, in the above-mentioned DVI standard, a Detailed Timing (DT) area as an area describing detailed video signal setting information, an Established Timing (ET) area as an area describing simplified video signals, and a Standard Timing (ST) area are defined within EDID. Japanese Patent Laid-Open No. 2008-252819 discloses a technique for obtaining an optimal video signal by rewriting EDID, in the case where settings such as image quality and resolution of the TV receiver serving as a video display apparatus differs from normal settings.

However, the technique of Japanese Patent Laid-Open No. 2008-252819 is directed to rewriting the identification information of displayable video signals in the case where the settings of the video display apparatus are changed, and does not determine whether the video output apparatus is capable of outputting a compatible video signal. That is, if information on a compatible video signal of the video display apparatus that has been rewritten with reference to only the settings of the video display apparatus is transmitted, an incompatible video signal could possibly be output from the video output apparatus.

SUMMARY OF THE INVENTION

The present invention has been made in view of such problems with conventional technology. The present invention provides for a video signal displayable by a video display apparatus to be readily output by a video output apparatus.

The present invention in its first aspect provides a video display apparatus provided with a notifying unit configured to transmit, to a video output apparatus, compatible video signal information having first information indicating a plurality of pixel numbers of video signal displayable by the video display apparatus and second information that is setting information required in order for the video output apparatus to generate video signals having at least a portion of the plurality of pixel numbers and being displayable by the video display apparatus, comprising: a determining unit configured to determine whether a video signal received from the video output apparatus after the compatible video signal information is transmitted to the video output apparatus by the notifying unit is a video signal having a pixel number displayable by the video display apparatus and being displayable by the video display apparatus; and an updating unit configured to update the second information of the compatible video signal information, in a case where it is determined by the determining unit that the video signal received from the video output apparatus is a video signal having a pixel number displayable by the video display apparatus and not being displayable by the video display apparatus, such that the setting information for the pixel number of the video signal received from the video output apparatus is included in the second information, wherein the notifying unit transmits the compatible video signal information updated by the updating unit to the video output apparatus.

Further features of the present invention will become apparent from the following description of exemplary embodiments (with reference to the attached drawings).

BRIEF DESCRIPTION OF THE DRAWINGS

FIGS. 2A, 2B and 2C are diagrams showing the data structure of EDID according to an embodiment of the present invention.

FIG. 4 is a flowchart of video output processing according to Embodiment 2 of the present invention.

FIG. 5 is a flowchart of video display processing according to Embodiment 2 of the present invention.

DESCRIPTION OF THE EMBODIMENTS

Embodiment 1

Hereinafter, a preferred embodiment of the present invention is described in detail with reference to the drawings. Note that in the embodiment described hereinafter, an example in which the present invention is applied to a system constituted by an LCD 100 serving as a video display apparatus and a PC 200 serving as a video output apparatus that are capable of communicating with each other in compliance with the DVI standard is described as an exemplary video display system. However, the present invention is applicable to an arbitrary video display system including a video display apparatus and a video output apparatus in which it is possible to communicate information on video signals displayable on the video display apparatus that complies with standards such as the HDMI standard and the Display Port standard.

Also, in this specification, "compatible video signal information" is assumed to denote information describing a video signal displayable by the LCD 100 that is included in EDID stored in an after-mentioned EDID memory 104 of the LCD 100. Also, "detail description" is assumed to denote more detailed setting information related to signal processing such as pixel clock, effective pixels and blanking, rather than general information such as resolution, vertical scanning frequency or aspect ratio, out of information contained in the compatible video signal information. Note that in the present embodiment, the LCD 100 and the PC 200 comply with the DVI standard, with the LCD 100 being equivalent to a sync apparatus and the PC 200 being equivalent to a source apparatus.

Configuration of Video display System

Figure 1:
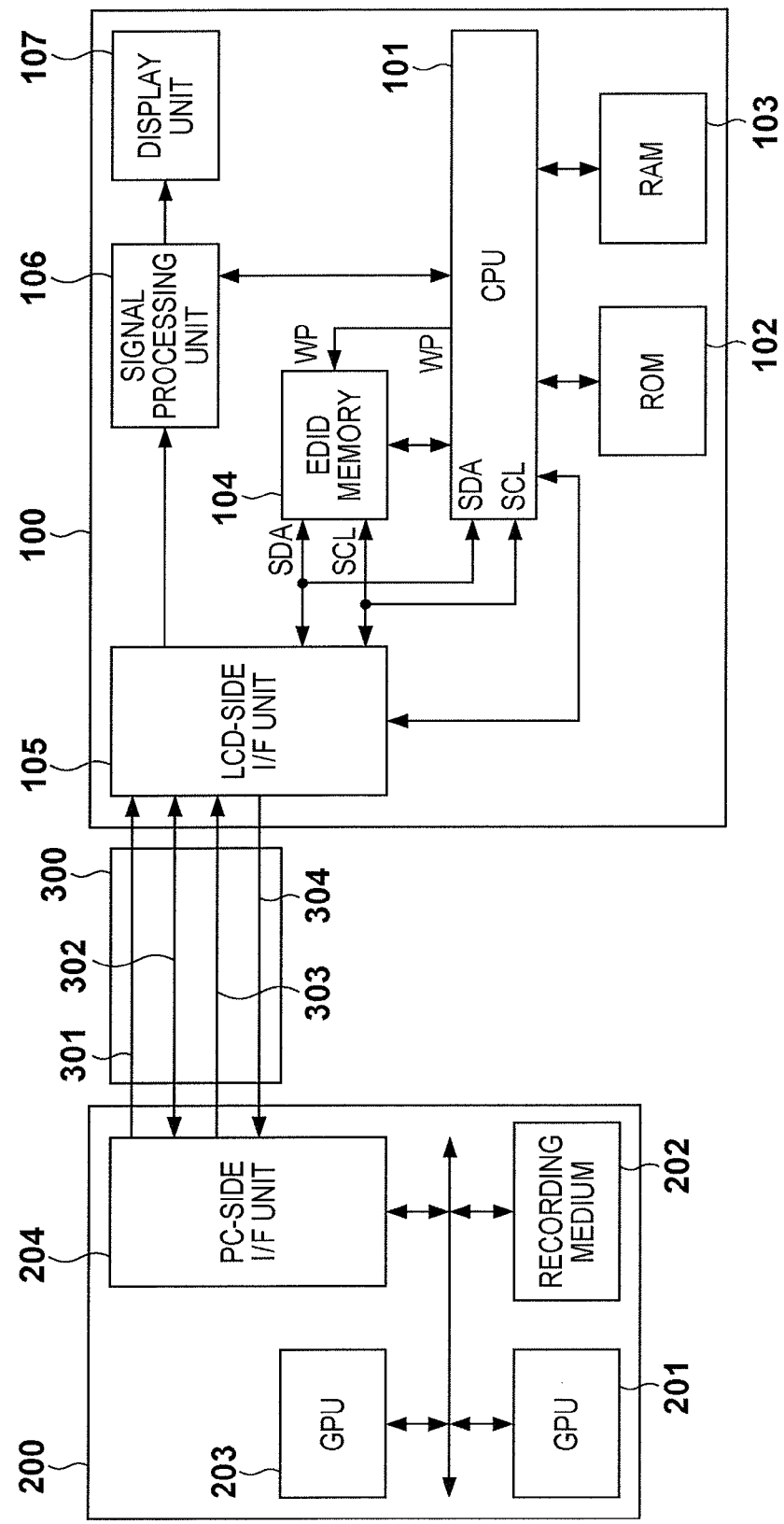
FIG. 1 is a block diagram showing a functional configuration of a video display system according to an embodiment of the present invention.

FIG. 1 is a block diagram showing functional configurations of the LCD 100 and the PC 200 that are included in the video display system according to an embodiment of the present invention.

Configuration of LCD 100

A CPU 101 is a block that controls the operations of the blocks provided in the LCD 100. Specifically, the CPU 101 controls the operations of the blocks provided in the LCD 100 by reading out a program for after-mentioned video display processing from a ROM 102, for example, and expanding and executing the read program in a RAM 103.

The ROM 102, which is a rewritable non-volatile memory such as an EEPROM, stores not only the program for video display processing but also information such as a program relating to operation control of the LCD 100 and setting parameters required in the operations of the blocks. Note that in the present embodiment, it is assumed that the ROM 102 stores information on displayable video signals of the LCD 100, such as resolution and vertical scanning frequency and a table showing the parameters of information in the detail descriptions. It is not, however, essential that the parameters of information in the detail descriptions be stored in the ROM 102, and a calculation formula for calculating the parameters of information in the detail descriptions from information such as resolution and vertical scanning frequency may be stored. The calculation formula is defined by the EIA/CEA-861 standard, for example, and is selected for each video display apparatus from a number of types of calculation formulas for respective compatible resolutions.

The RAM 103, which is a volatile memory, serves not only as an expansion area of the above-mentioned program for video display processing but also as a storage area for temporarily storing data output during the operations of the blocks and data input from an external device such as the PC 200.

Note that although the present embodiment is described assuming that processing is realized in the blocks provided in the LCD 100 as hardware, implementation of the present invention is not limited thereto, and the processing of the blocks may be realized by a program that performs similar processing to the blocks.

The EDID memory 104 is a non-volatile memory for storing EDID including compatible video signal information, and it is assumed that the EDID is stored in advance when the LCD 100 is shipped, for example. Note that the present embodiment is described assuming that the EDID is rewritable.

The EDID memory 104 and the CPU 101 are connected by a Serial Data (SDA) terminal, a Serial Clock (SCL) terminal and a Write Protect (WP) terminal. Communication between the EDID memory 104 and the CPU 101 complies with the I2C standard, and in the case of rewriting information in the EDID memory 104, rewriting is performed using write processing that complies with this standard, after performing control to release the WP.

Data Configuration of EDID

Figure 2A:
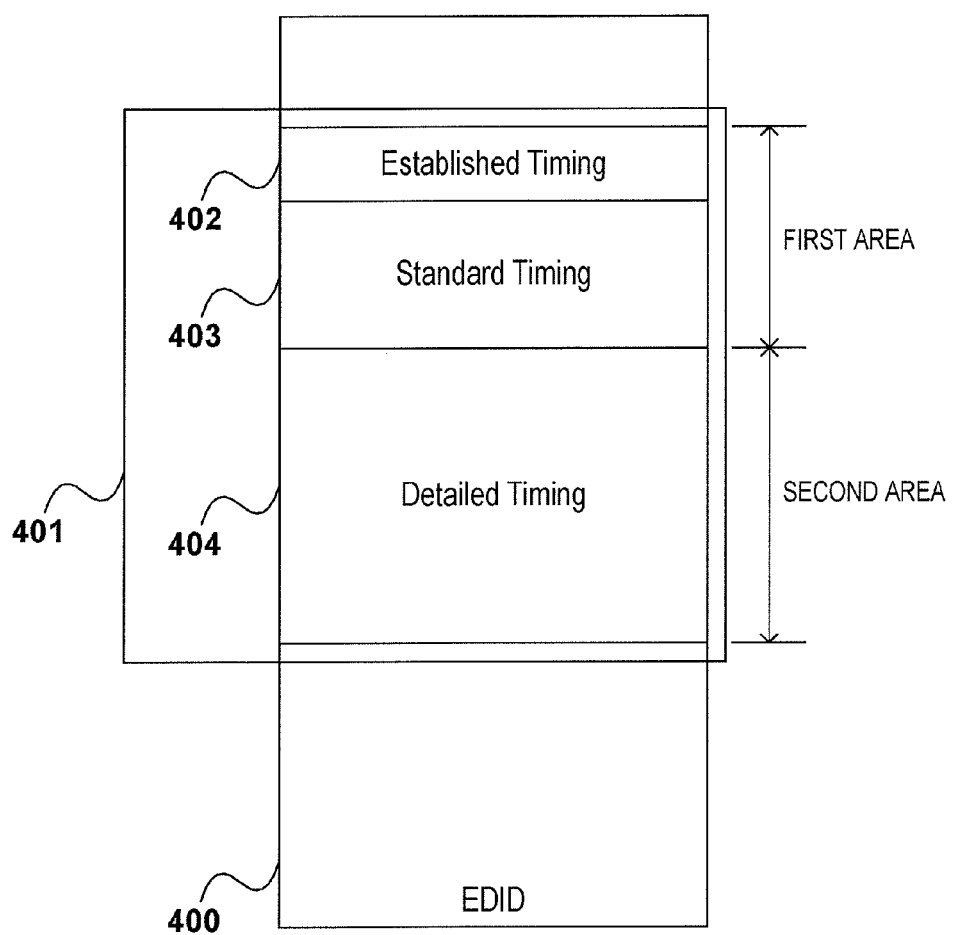

Here, the data configuration of EDID in the present embodiment is described in detail hereinafter using FIG. 2A and FIG. 2B. Note that the descriptive content of the EDID is assumed to be defined by the Video Electronics Standards Association (VESA) standard.

In addition to header information, basic display parameters and the like (not shown), EDID 400 includes a compatible video signal description area 401 where the compatible video signal information, which is information on video signals displayable by the LCD 100, is described. The compatible video signal description area 401 is constituted by a first area where general information such as resolution, vertical scanning frequency and aspect ratio is described, and a second area where detail descriptions, which are pieces of detailed setting information related to signal processing, are described. Specifically, the first area is constituted by an Established Timing (ET) area 402 and a Standard Timing (ST) area 403 and the second area is constituted by a Detailed Timing (DT) area 404.

The ET area 402 consists of a 2-byte (16-bit) area for defining combinations of resolutions and vertical scanning frequencies compatible with the LCD 100 (Established Timings 1, Established Timings 2), and a 1-byte (8-bit) reserve area for the manufacturer to define other combinations of resolutions and vertical scanning frequencies (Manufacturer's Reserved Timings). Note that the 16 bits of the 2-byte area respectively correspond to 16 different combinations (640×480@60 Hz, 800×600@60 Hz, . . . ) of resolutions (horizontal pixel count×perpendicular pixel count) and vertical scanning frequencies defined by the VESA standard, and if the value of a bit is 1, this means that the corresponding combination can be displayed.

The ST area 403 is an area for defining horizontal resolution, aspect ratio and vertical scanning frequency, and is constituted by 16 bytes. Formats that are not supported in the ET area 402 are described in the ST area 403. Since the combinations of horizontal resolution, aspect ratio and vertical scanning frequency can be constituted by 2 bytes, a maximum of eight different combinations of these pieces of information can be described in the ST area 403 (Standard Timing Identifications #1 to #8).

Thus, since specific information on compatible video signals, such as blanking period and sync width, is not included in the first area consisting of the ET area 402 and the ST area 403, video signal displayable by the LCD 100 cannot be defined with that area only. This specific information is described in the DT area 404 as detail identifiers.

The DT area 404 is an area of 72 bytes in total for describing the detail identifiers, which are pieces of detailed setting information on video signals displayable by the LCD 100 that are related to signal processing and are not included in the above-mentioned ET area 402 and ST area 403. Since a single video signal can be described using 18 bytes, detail identifiers for a maximum of four types of video signals can be describe in this area. Note that the detail identifier for a single video signal includes information such as pixel clock (corresponds to vertical scanning frequency), respective effective pixels in the horizontal and vertical directions (corresponds to resolution), blanking, front porch, sync width, image size and interlacing.

Since the DT area 404 is also used for describing the serial number and product name of the LCD 100, often detail identifiers for no more than two types of video signals are typically described in this area. That is, depending on the number of resolutions compatible with the LCD 100, detail identifiers for all displayable video signals cannot be included in the DT area 404. For example, within the DT area 404 (Detailed Timing Description #1 to #4), detail identifiers for video signals are described in Detailed Timing Descriptions #1 to #2, and the serial number and product name of the LCD 100 are described in Detailed Timing Descriptions #3 and #4.

Note that not all of the resolution and vertical scanning frequency information of video signals displayable by the LCD 100 needs to be described in the ET area 402 and ST area 403 of the EDID 400. That is, the ET area 402 and the ST area 403 have capacity restrictions, and it may not be possible to write all of the resolution and vertical scanning frequency information of displayable video signals depending on the type of video display apparatus. Such video display apparatuses are also envisaged, and the LCD 100 of the present embodiment is described hereinafter assuming that information on video signals that are displayable by the LCD 100 but could not be included in the ET area 402 or the ST area 403 of the EDID 400 is also stored in the ROM 102.

EDID thus constituted and stored in the EDID memory 104 is transmitted to the PC 200 connected using a DVI cable 300 via an LCD-side I/F unit 105 on receipt of a request. The LCD-side I/F unit 105 is a video signal input interface that complies with the DVI standard.

Configuration of DVI Cable 300

Here, signal lines constituting the DVI cable 300 will now be described. Note that although the description of the present embodiment illustrates only the signal lines of the DVI cable 300 specifically required for implementation of the present invention, and stops at describing only these signal lines in this specification, it should be readily understood that a generic cable that complies with the DVI standard can be used.

The DVI cable 300 has a Transition Minimized Differential Signaling (TMDS) line 301, a Display Data Channel (DDC) line 302, a +5V line 303, and a Hot Plug Detect (HPD) line 304.

The TMDS line 301 is a signal line used for video signal input from the PC 200 to the LCD 100. The TMDS line 301 includes a TMDS channel 0, a TMDS channel 1, a TMDS channel 2, and a TMDS clock channel.

The DDC line 302 is a signal line used in order to send EDID, which is device information on the LCD 100, from the LCD 100 to the PC 200. The communication method via the DDC line 302 complies with the I2C standard. The DDC line 302 includes a DDC data line and a DDC clock line, which are respectively connected to the SDA terminal and the SCL terminal of the EDID memory 104.

The +5V line 303 is a power supply line for feeding a +5V power supply from the PC 200 to the LCD 100. The CPU 101 is able to determine whether the PC 200 is connected, depending on whether a 5V power supply is being fed from +5V line 303.

The HPD line 304 is a signal line for sending a HPD signal having a high-voltage level (hereinafter, H-level) or a low-voltage level (hereinafter, L-level) from the LCD 100 to the PC 200. Specifically, if it is determined that the PC 200 is connected, the CPU 101 causes a H-level HPD signal to be output from the LCD-side I/F unit 105, in order to notify the PC 200 that connection has been established. Also, in the case of stopping input of a video signal from the PC 200, the CPU 101 is able to stop output of the video signal from the PC 200 as a state where connection is temporarily released, by causing an L-level HPD signal to be output from the LCD-side I/F unit 105.

A signal processing unit 106 processes video signals input from the PC 200 via the TMDS line 301. Specifically, when a received video signal is input from the LCD-side I/F unit 105, the signal processing unit 106 analyzes the video signal, and obtains information required in order to determine whether the video signal is displayable by the LCD 100. Information required in order to determine whether the video signal is displayable includes at least resolution and information on items described in the detail descriptions such as blanking and effective pixels (detailed setting information).

The video signal input to the signal processing unit 106 is output from the signal processing unit 106 to the display unit 107 in the case where the video signal is displayable by the LCD 100, and is displayed in the display region of the display unit 107. The display unit 107, which is a display apparatus such as a liquid crystal panel, displays input video signals.

Configuration of PC 200

A PC-CPU 201 controls the operations of the blocks provided in the PC 200, by expanding and executing an operating system recorded on a recording medium 202. The recording medium 202 is a recording apparatus such as a built-in memory provided in the PC 200 or a HDD (Hard Disc Drive) or SSD (Solid State Drive) detachably connected to the PC 200. In addition to the operating system, the recording medium 202 has recorded thereon a program for video output processing of Embodiment 2 that is mentioned later, applications that are executed in the PC 200, and data that is used by the applications.

A graphic processing unit (GPU) 203 generates and outputs, frame-by-frame, the video signal of a graphical user interface (GUI) for displaying on the LCD 100, in accordance with the operating system. The video signal output from the GPU 203 is output to the LCD 100 connected to the PC 200 via a PC-side I/F unit 204, using the TMDS line 301 of the DVI cable 300.

Note that the PC 200 is assumed to store information on an outputtable video signal in a non-volatile memory (not shown), for example, and the GPU 203 is assumed to generate and output a video signal that conforms to the format of the outputtable video signal. Also, the PC-CPU 201, in the case where EDID of the LCD 100 is received from the LCD 100 via the PC-side I/F unit 204, selects the description corresponding to the outputtable video signal, from the descriptions of video signals included in the EDID, and causes the GPU 203 to generate the video signal. Note that in the case where a plurality of descriptions corresponding to video signals outputtable by the PC 200 exist in the descriptions of displayable video signals in the EDID, the PC-CPU 201 can automatically decide on the format of a video signal to be output according to a prescribed priority order. For example, the PC-CPU 201 decides on the format of the video signal to be output in a priority order such as Detailed Timing Description #1, Detailed Timing Description #2, Standard Timing Identifications #1, #2, . . . #8, Established Timings 1 and Established Timings 2. Also, the PC-CPU 201 may decide on the format of the video signal to be output by assigning priorities in descending order from high to low resolution. Note that the PC-side I/F unit 204 transmits a reception request for EDID via the DDC line 302, in the case where an H-level HPD signal is received via the HPD line 304 of the DVI cable 300.

Video Display Processing

Figure 3:
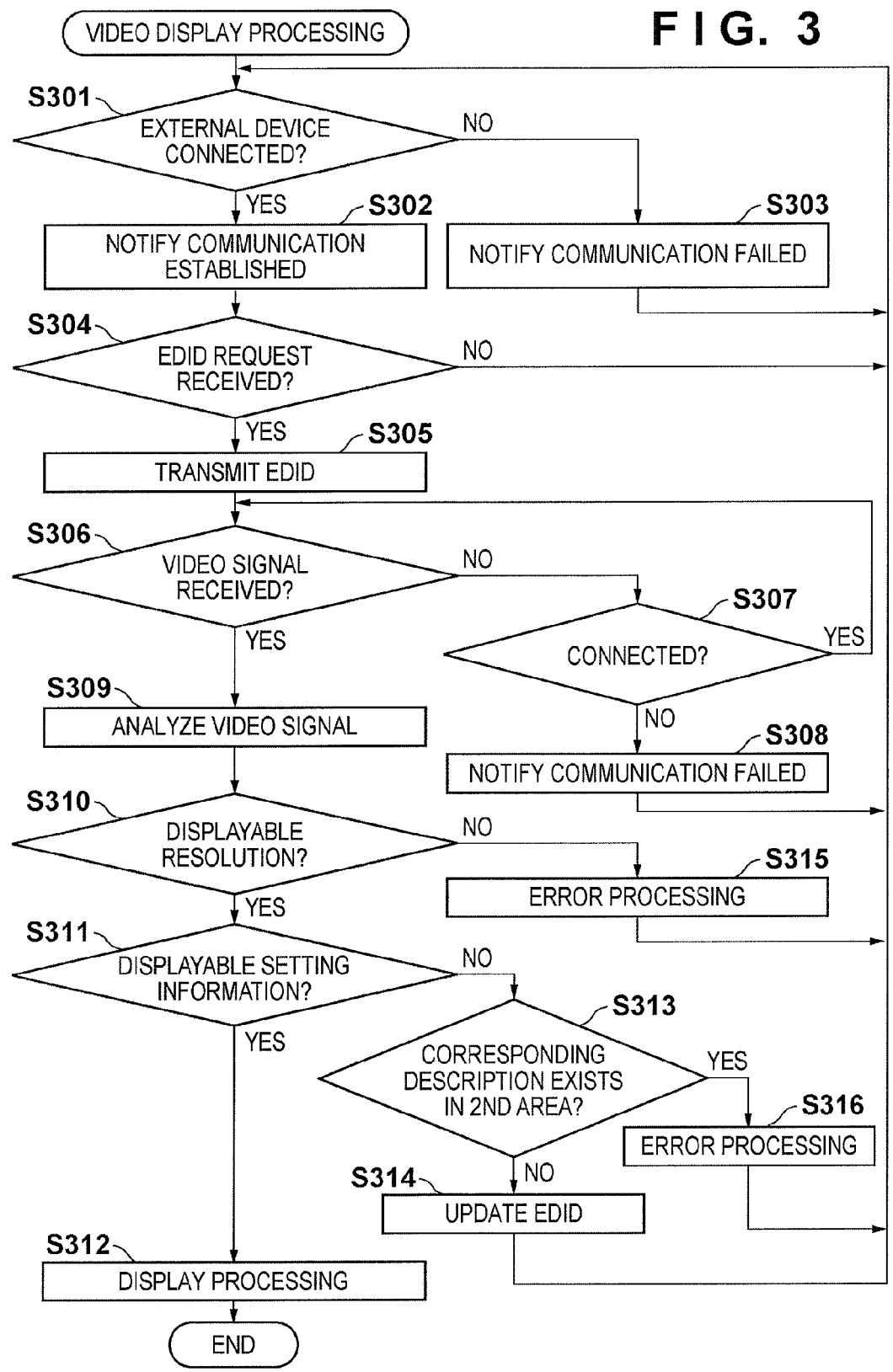
FIG. 3 is a flowchart of video display processing according to Embodiment 1 of the present invention.

Specific processing will be described using the flowchart of FIG. 3, with regard to video display processing by the LCD 100 of the present embodiment having such a configuration. Processing corresponding to the flowchart can be realized as a result of the CPU 101 reading out a corresponding processing program stored in the ROM 102, for example, and expanding and executing the read program in the RAM 103. Note that this video display processing is described assuming that the processing is started when the LCD 100 is powered on, for example.

At S301, the CPU 101 determines whether an external device (PC 200) for performing video input to the LCD 100 is connected. Specifically, the CPU 101 determines whether an external device is connected, depending on whether a 5V power supply is being fed to the LCD-side I/F unit 105 via the +5V line 303. The CPU 101 shifts the processing to S302 if it is determined that an external device is connected, and shifts the processing to S303 if it is determined that an external device is not connected.

At S302, the CPU 101 transmits an H-level Hot Plug Detect (HPD) signal from the LCD-side I/F unit 105 via the HPD line 304, in order to notify the connected external device that connection is established and that EDID can be transmitted.

At S303, the CPU 101 transmits an L-level HPD signal from the LCD-side I/F unit 105 via the HPD line 304. This is for notifying the external device that while the external device and the LCD 100 are physically connected by the DVI cable 300, connection is not regarded as having been established since a 5V power supply is not being fed. The CPU 101 returns the processing to S301 after transmission of the L-level HPD signal. Note that in this step, the CPU 101 may control the LCD-side I/F unit 105, such that communication cannot be performed via the DDC line 302 to the connected external device.

At S304, the CPU 101 determines whether EDID was requested by the connected external device in response to being notified that connection is establishment. Specifically, the CPU 101 determines whether there is a request, depending on whether an EDID request signal was input to the LCD-side I/F unit 105 via the DDC line 302. The CPU 101 shifts the processing to S305 if there is a request for EDID, and returns the processing to S301 if there is not a request since the external device may have failed to receive notification that connection is established.

At S305, the CPU 101 reads out the EDID 400 from the EDID memory 104, and transmits the read EDID to the connected external device. Specifically, the CPU 101 inputs the read EDID 400 to the LCD-side I/F unit 105, and causes the EDID to be transmitted to the connected external device via the DDC line 302.

Once the EDID has been transmitted to the PC 200 serving as the external device in this step, the PC-CPU 201 selects one format of video signal outputtable by the PC 200 from the information on video signals displayable by the LCD 100 that is included in the EDID. For example, the format of the video signal to be output is selected in a priority order such as Detailed Timing Description #1, Detailed Timing Description #2, Standard Timing Identification #1, #2, . . . #8, Established Timings 1, and Established Timings 2. The PC-CPU 201 discriminates, in descending priority order of the formats, whether each format can be output by the PC 200, and selects the highest priority format that is discriminated as being an outputtable format. When notified by the LCD 100 that the selected format is not a format displayable by the LCD 100, the next highest priority format is selected. The PC-CPU 201 causes the GPU 203 to generate a video signal compatible with that format, and outputs the generated video signal to the LCD 100 via the PC-side I/F unit 204.

Note that at the point in time at which the EDID is transmitted after the LCD 100 and the PC 200 are initially connected, the CPU 101 will not be aware of the formats of video signal outputtable by the PC 200. For this reason, the CPU 101 may be unable to transmit EDID that includes the detail descriptions of video signals that can be output by the PC 200 and displayed by the LCD 100 to the PC 200. That is, the video signal generated by the GPU 203 and output via the PC-side I/F unit 204 will be a signal corresponding to a simplified setting such as a combination of a resolution and a vertical scanning frequency, among the video signals displayable by the LCD 100. Alternatively, in the case where all of the combinations of resolutions and vertical scanning frequencies described in the EDID do not correspond to a video signal outputtable by the PC 200, a signal that does not even correspond to a simplified setting could possibly be output.

This is because the detail descriptions described in the DT area 404 of the received EDID 400 will not necessarily describe the detailed setting information of a video signal having a resolution outputtable by the PC 200, among the resolutions displayable by the LCD 100. In other words, the video signal output by the PC 200 as a result of transmitting EDID may be a video signal generated in accordance with information selected as corresponding to information described in the ET area 402 or the ST area 403 of the EDID, among the video signals outputtable by the PC 200.

Note that in the case where the information described in the detail descriptions in the DT area 404 matches the detailed setting information and the resolution of a video signal having a resolution outputtable by the PC 200, the PC 200 generates and outputs that video signal. That is, the video signal output from the PC 200 will be a video signal displayable by the LCD 100.

At S306, the CPU 101 determines whether a video signal generated according to the EDID as mentioned above has been received from the connected external device. Specifically, the CPU 101 determines whether the LCD-side I/F unit 105 has received a video signal from the connected external device via the TMDS line 301. The CPU 101 shifts the processing to S309 if it is determined that a video signal generated by the connected external device according to the EDID has been received, and shifts the processing to S307 if it is determined that such a video signal has not been received (in the case where communication failure, etc., has occurred).

At S307, the CPU 101 determines whether the external device with which connection was established at S301 is still connected. Specifically, the CPU 101 determines whether the external device is connected, depending on whether a 5V power supply is being fed to the LCD-side I/F unit 105 via the +5V line 303, similarly to S301. The CPU 101 returns processing to S306, if it is determined that the external device with which connection was established is still connected (in a case such as where the external device is connected but is still preparing transmission of a video signal). Also, if it is determined that the external device with which connection was established is not connected, the CPU 101 transmits an L-level HPD signal from the LCD-side I/F unit 105 via the HPD line 304 (S308), similarly to S303, and returns the processing to S301.

If it is determined at S306 that a video signal has been received, the CPU 101, in S309, causes the signal processing unit 106 to analyze the received video signal, and obtains information required in order to determine whether the video signal is displayable by the LCD 100. The present embodiment is hereinafter described assuming that the information required in order to determine whether the video signal obtained by the signal processing unit 106 is displayable by the LCD 100 is the detailed setting information and the resolution of the received video signal. However, implementation of the present invention is not limited thereto, and the information obtained through the analysis by the signal processing unit 106 can be any information that enables it to be determined whether the received video signal is a video signal displayable by the LCD 100. Note that the detailed setting information for the received video signal is described hereinafter as being information that indicates all of the parameters described as detail descriptions in the second area of the EDID. However, as long as it can be determined whether the video signal is displayable as mentioned above, the detailed setting information for the received video signal may be constituted by at least a portion of the parameters of the detail descriptions.

At S310, the CPU 101 determines whether the resolution of the received video signal obtained by the signal processing unit 106 is the resolution of a video signal displayable by the LCD 100. Specifically, the CPU 101 determines whether the resolution of the received video signal obtained by the signal processing unit 106 is a resolution described in the first area and the second area of the EDID 400 stored in the EDID memory 104. Additionally, the CPU 101 determines whether the resolution of the received video signal is described as the resolution of a video signal displayable by the LCD 100 that is stored in the ROM 102 but could not included in the EDID 400. In this step, the CPU 101 thus determines whether there is a matching resolution, by comparing the resolution of the received video signal with all of the resolutions that are displayable by the LCD 100. The CPU 101 shifts the processing to S311 if the resolution of the received video signal is the resolution of a video signal displayable by the LCD 100. On the other hand, if the resolution of the received video signal is not the resolution of a displayable video signal (e.g., 1600× 1200@60 Hz), the CPU 101 returns the processing to S301 after performing the error processing of S315. Note that error processing is video mute processing or processing for notifying an error message to the display unit 107. Also, after this error processing, the processing from S301 is executed and EDID is again transmitted to the PC 200, although in the case where information on another resolution outputtable by the PC 200 exists in the first area and the second area of the EDID, the PC 200 is assumed to generate and transmit a video signal having that resolution.

At S311, the CPU 101 determined whether the detailed setting information for the received video signal matches the detailed setting information of a video signal displayable by the LCD 100 with regard to the resolution of the received video signal. Specifically, the CPU 101 compares the detailed setting information acquired through the signal analysis in S309 with the detailed setting information of video signals displayable by the LCD 100 (detailed setting information stored in the ROM 102). In the case where information relating to the detailed format, other than resolution, such as blanking and sync width can also be obtained in the signal analysis of S309, by obtaining metadata added to the received video signal, calculation processing using the calculation formula stored in the ROM 102 is unnecessary. The CPU 101 shifts the processing to S312 if the detailed setting information for the received video signal matches the detailed setting information of a video signal displayable by the LCD 100, and shifts the processing to S313 if the information does not match. Note that although the present embodiment is described assuming that the detailed setting information of video signals displayable by the LCD 100 is stored in the ROM 102, a configuration may be adopted in which detailed setting information is calculated from information such as resolution, using the calculation formula stored in the ROM 102, in which case the memory capacity for storing detailed setting information can be reduced.

At S312, the CPU 101 causes the video signal received from the connected external device to be output to the display unit 107 by the signal processing unit 106, and displayed. The CPU 101 completes the video display processing once the received video signal is displayed.

At S313, the CPU 101 determines whether the resolution of the received video signal is described in a detail description in the second area of the EDID 400. Specifically, the CPU 101 determines whether it was determined that the resolution of the received video signal is described as effective pixels in a detail description in the second area of the EDID 400. That is, if the resolution of the received video signal is already described in the second area of the EDID 400 transmitted to the connected external device (e.g., in the case where a 1920× 1080@60 Hz video signal having an incompatible detailed format such as blanking or sync width is received), it can be determined that the external device is not capable of outputting a video signal having the detailed setting information described in the detail descriptions. In other words, it can be determined that whatever EDID is transmitted from the LCD 100 to the connected external device based on information in the ROM 102, a video signal displayable by the LCD 100 cannot be received for a video signal of that resolution. In the case where a video signal having incompatible detailed format such as blanking or sync width is transmitted from the external device despite detailed setting information being described in the second area of the EDID 400, it is conceivable that, rather than generating a video signal having the detailed setting information in the second area of the transmitted EDID 400, the external device has generated the video signal with reference to information in the first area or to information in the second area other than the detailed format. That is, it is conceivable that the external device is not able to output a video signal having a detailed format compatible with the LCD 100 (e.g., in the case where the external device is not able to output a video signal matching the entire detailed format such as blanking and sync width for 1920× 1080@60 Hz, with reference to Detailed Timing Description #2 in FIG. 2B). The CPU 101 executes error processing (S316) and returns the processing to S301 if the resolution of the received video signal is described in a detail description of the EDID 400, and shifts the processing to S314 if the resolution is not described.

At S314, the CPU 101 updates the detail descriptions included in the DT area 404 of the EDID stored in the EDID memory 104, using the detailed setting information of the video signals displayable by the LCD 100. Specifically, the CPU 101 first transmits an L-level HPD signal from the LCD-side I/F unit 105 via the HPD line 304, in order to notify the PC 200 that EDID cannot be transmitted due to rewriting of the contents of the EDID. Thereafter, the CPU 101 releases the WP (write protection) of the EDID memory 104 and updates the contents of the detail descriptions, and then sets the EDID memory 104 to WP again, and returns the processing to S301.

FIG. 2C is a diagram showing exemplary EDID after updating. When contrasted with the EDID before updating shown in FIG. 2B, the format information corresponding to 1920×1200@60 Hz described in Standard Timing Identification #1 has been rewritten to format information corresponding to 1920×1080@60 Hz. Also, the detailed format information corresponding to 1920×1080@60 Hz described in Detailed Timing Description #2 has been rewritten to detailed format information corresponding to 1920×1200@60 Hz. In the case where the video signal from external device is a 1920×1200@60 Hz video signal having an incompatible detailed format, detailed format information corresponding to 1920×1200@60 Hz which is displayable by the LCD 100 is thus written in the DT area 404. With the EDID before updating shown in FIG. 2B, format information corresponding to 1920×1200@60 Hz is described in Standard Timing Identification #1, but information indicating the detailed format such as blanking and sync width is not described in the ST area 403. For this reason, it can be assumed that the external device has output a video signal having a default detailed format. For example, in a case such as where the LCD 100 is compatible with a 1920×1200@60 Hz video signal having a vertical synchronizing signal sync width (V Sync. Pulse Width) of 3 lines, and a 1920×1200@60 Hz video signal having a vertical synchronizing signal sync width (V Sync. Pulse Width) of 5 lines is output from the external device, the CPU 101 updates the EDID shown in FIG. 2B to the EDID shown in FIG. 2C. Note that although the case where the vertical synchronizing signal sync widths (V Sync. Width) do not match was illustrated here, processing will be similar in the case where other parameters (H active/Blanking, V Active/Blanking, H Sync. Pulse Width, Image Size, interlacing information (Flags), etc.) described as the detailed format do not match.

Note that this step was described assuming that the detailed setting information stored in the ROM 102 is used, in the case where the resolution of the received video signal is not included in a detail description of the EDID 400 in S313, to update the EDID with regard to that resolution. However, updating of the EDID may be executed in this step in the case where the condition for updating is that the resolution of the received video signal is not included in a detail description and is described in the first area. In this case, processing time is shortened.

This enables the resolution of the video signal output according to the EDID from the external device connected to the CPU 101 to be specified, and the EDID to be updated with detailed setting information required in order for the LCD 100 to display a video signal of that resolution. That is, since the EDID is rewritten after having ascertained the resolution of the video signal that is output by the connected external device according to the EDID of the LCD 100, a video signal displayable by the LCD 100 can be readily output from the external device.

Note that a configuration may be adopted such that in the case where a plurality of video signals displayable by the LCD 100 exist for the resolution of the received video signal, a plurality of detail descriptions (Detailed Timing Description #1, Detailed Timing Description #2) are written in the DT area 404 in the EDID update processing of S314. Alternatively, a configuration may be adopted such that in the case where one type of detail description is written in the DT area 404 in one loop of the video display processing and that detail description is not compatible with the connected external device, the detail description is rewritten to a different detail description in the next loop. Note that in the latter case, execution of error processing can be controlled depending on whether the detail description is different in the determination of S313. Also, the method of updating is not limited to directly updating EDID stored in the EDID memory 104 as mentioned above, and EDID may be rewritten with a method that involves copying the EDID to the RAM 103, for example, updating the information of the copied EDID, and transmitting the updated EDID to the connected external device.

As described above, with the video display apparatus of the present embodiment, a video signal displayable by the video display apparatus can be readily output from a video output apparatus. Also, detailed conditions for enabling a video signal output by the video output apparatus to the video display apparatus to be displayed on the video display apparatus can be notified to the video output apparatus. That is, if the video output apparatus is capable of outputting a video signal compatible with the detailed conditions, the video display apparatus is able to receive a displayable video signal from the video output apparatus.

Embodiment 2

In the above-mentioned Embodiment 1, a method of notifying detailed settings for enabling a video signal of a resolution output by a video output apparatus to be displayed by a video display apparatus to the video output apparatus by transmitting compatible video signal information updated according to a received video signal was described. In Embodiment 2, a mode is described in which, rather than compatible video signal information being updated in the video display apparatus, an inquiry is made about detailed settings for enabling display by the video display apparatus, with regard to a video signal of an output resolution scheduled for output from the video output apparatus to the video display apparatus.

Note that the present embodiment is described hereinafter assuming that the configurations of a PC 200 serving as a video output apparatus and a LCD 100 serving as a video display apparatus described hereinafter are similar to the above-mentioned Embodiment 1.

Video Output Processing

Specific processing is described using the flowchart of FIG. 4, with regard to video output processing by the PC 200 of the present embodiment. Processing corresponding to this flowchart can be realized as a result of the PC-CPU 201 reading out a corresponding processing program stored in the recording medium 202, for example, and expanding and executing the read program in a RAM (not shown). Note that this video output processing is described assuming that the processing is started when the PC 200 is powered on, for example.

At S401, the PC-CPU 201 determines whether connection with a display apparatus (LCD 100) is established. Specifically, the PC-CPU 201 determines whether connection with a display apparatus is established, depending on whether an H-level HPD signal has been received by the PC-side I/F unit 204 via the HPD line 304. The PC-CPU 201 shifts the processing to S402 if it is determined that connection with a display apparatus is established, and repeats this processing if it is determined that connection is not established.

At S402, the PC-CPU 201 requests the connected display apparatus to transmit EDID. Specifically, the PC-CPU 201 causes the PC-side I/F unit 204 to transmit an EDID request signal to the connected display apparatus via the DDC line 302.

At S403, the PC-CPU 201 determines whether EDID of the connected display apparatus has been received from the display apparatus. Specifically, the PC-CPU 201 determines whether EDID has been received by the PC-side I/F unit 204 via the DDC line 302. The PC-CPU 201 shifts the processing to S404 after storing the received EDID in a RAM (not shown) if it is determined that EDID has been received, and returns the processing to S401 if it is determined that EDID has not been received.

At S404, the PC-CPU 201 determines whether a resolution that matches the resolution of a video signal outputtable by the PC 200 that is stored in a non-volatile memory (not shown) is described in the second area of the EDID of the connected display apparatus. That is, it is determined whether a video signal having a resolution displayable by the connected display device can be output by the PC 200, by referring to the information in the second area of the EDID. The PC-CPU 201 shifts the processing to S407 if a resolution matching the resolution of a video signal outputtable by the PC 200 is described in the second area of the EDID.

Also, if a resolution matching the resolution of a video signal outputtable by the PC 200 is not described in the second area of the EDID, the PC-CPU 201 advances the processing from S404 to S410. The PC-CPU 201, at S410, then determines whether a resolution matching the resolution of a video signal outputtable by the PC 200 is described in the first area of the EDID. That is, the PC-CPU 201 determines whether a video signal having a resolution displayable by the connected display apparatus can be output by the PC 200, by referring to the information in the first area of the EDID. The PC-CPU 201 shifts the processing to S405 if a resolution matching the resolution of a video signal outputtable by the PC 200 is described in the first area of the EDID.

Also, the PC-CPU 201, in the case where a resolution matching the resolution of a video signal that can be output is not described in the first area of the EDID, returns the processing to S401 after executing the error processing of S411. This error processing is processing for notifying the display apparatus (LCD 100) via the DDC line 302 that a resolution matching the resolution of a video signal outputtable by the PC 200 is not described in the EDID. The display apparatus (LCD 100), on receipt of the error notification, rewrites the contents of the EDID and transmit the EDID to the PC 200 again.

The processing of S405 and S406 is executed in the case where, with regard to the resolution of a video signal outputtable by the PC 200, information on the resolution of the video signal is included in the first area of the EDID but a detail description corresponding to the video signal is not described in the second area.

At S405, the PC-CPU 201 requests the display apparatus for detailed setting information on the video signal displayable by the connected display apparatus, with regard to one resolution of a video signal outputtable by the PC 200, among the resolutions included to the first area of the EDID. At this time, the one resolution of a video signal outputtable by the PC 200, among the resolutions included to the first area of the EDID, is the resolution of the video signal scheduled for output that is selected by the PC-CPU 201 according to the received EDID. That is, in this step, the PC-CPU 201 makes an inquiry to the display apparatus about detailed video signal setting information, in order to enable the video signal having the resolution scheduled for output to be displayed by the connected display apparatus.

Specifically, the PC-CPU 201 causes the PC-side I/F unit 204 to transmit to the connected display apparatus a signal for requesting detailed setting information on the video signal displayable by the display apparatus with regard to the resolution of the video signal that is scheduled for output via the DDC line 302. Note that the signal for requesting the detailed setting information in the present embodiment is assumed to be a command that complies with the DDC/CI standard. However, implementation of the present invention is not limited thereto, and a cable conforming to USB, IEEE1394 or the like may be separately connected, and detailed setting information may be requested and notified using these communications protocols.

At S406, the PC-CPU 201 then determines whether detailed setting information on the video signal displayable on the connected display apparatus with regard to the resolution of the video signal scheduled for output has been received from the display apparatus. Specifically, the PC-CPU 201 determines whether detailed setting information on the displayable video signal has been received by the PC-side I/F unit 204 via the DDC line 302. The PC-CPU 201 shifts the processing to S407 if detailed setting information on the displayable video signal has been received from the connected display apparatus, and repeats the processing of this step if this detailed setting information has not been received.

At S407, the PC-CPU 201 determines whether output of a video signal of the resolution scheduled for output that is compatible with the detailed setting information received at S406 is possible. Specifically, the PC-CPU 201 determines whether there exists information on a video signal having both the resolution scheduled for output and the received detailed setting information, with reference to the information on video signals outputtable by the PC 200 that is stored in a non-volatile memory (not shown). That is, in this step, the PC-CPU 201 determines whether output of a video signal displayable by the connected display apparatus is possible. The PC-CPU 201 shifts the processing to S408 if it is determined that output of a video signal displayable by the connected display apparatus is possible, and shifts the processing to S409 if it is determined that output is not possible.

At S408, the PC-CPU 201 causes the GPU 203 to generate a video signal having the resolution scheduled for output that is compatible with the detailed setting information received at S406 and output the generated video signal from the PC-side I/F unit 204 via the TMDS line 301, and thereafter ends this video output processing.

At S409, the PC-CPU 201 causes the GPU 203 to generate a video signal outputtable by the PC 200 having the resolution scheduled for output (video signal incompatible with the detailed setting information received at S406) and output the generated video signal from the PC-side I/F unit 204 via the TMDS line 301, and returns the processing to S401.

Note that in the case where information on another resolution outputtable by the PC 200 also exists in the first area of the EDID, it is assumed that the PC-CPU 201 repeats the processing of S405 to S410 for that resolution.

Video Display Processing

Next, specific processing is described using the flowchart of FIG. 5, with regard to video display processing by the LCD 100 of the present embodiment that corresponds to the above-mentioned video output processing. The processing corresponding to the flowchart can be realized as a result of the CPU 101 reading out a corresponding processing program stored in the ROM 102, for example, and expanding and executing the read program in the RAM 103. Note that this video display processing is described assuming that the processing is started when the LCD 100 is powered on, for example. Also, in this video display processing, the same reference numerals are given to steps for performing similar processing to the video display processing of Embodiment 1 mentioned above and description thereof is omitted, and only steps characteristic of the present embodiment are described hereinafter.

After transmitting the EDID at S305, the CPU 101, at S501, determines whether detailed setting information on a video signal displayable by the LCD 100 has been requested by the connected external device, with regard to the resolution of the video signal that is scheduled for output by the external device. Specifically, the CPU 101 determines whether a request signal for detailed setting information on a video signal displayable by the LCD 100, with regard to the resolution scheduled for output, has been received from the connected external device by the LCD-side I/F unit 105 via the DDC line 302. The CPU 101 shifts the processing to S502 if a request signal for detailed setting information has been received from the connected external device, and shifts the processing to S503 if this request signal has not been received.

At S502, the CPU 101 transmits the parameters of the detailed setting information on the video signal displayable by the LCD 100 to the connected external device, with regard to the received resolution of the video signal that is scheduled for output. Specifically, the CPU 101 reads out detailed setting information (information such as pixel clock (corresponds to vertical scanning frequency), respective effective pixels in the horizontal and vertical directions (corresponds to resolution), blanking, front porch, sync width, image size, and interlacing) stored in the ROM 102, and causes the detailed setting information to be transmitted to the connected external device via the DDC line 302.

At S503, the CPU 101 determines whether the external device with which connection was established at S301 is still connected. Specifically, the CPU 101 determines whether the external device is connected, depending on whether a 5V power supply is being fed to the LCD-side I/F unit 105 via the +5V line 303, similarly to S301. The CPU 101 shifts the processing to S306 if it is determined that the external device with which connection was established is still connected. Also, if it is determined that the external device with which connection was established is not connected, the CPU 101 transmits an L-level HPD signal from the LCD-side I/F unit 105 via the HPD line 304 similarly to S303 (S504), and returns the processing to S301.

If it is determined that a video signal has not been received from the connected external device at S306, the CPU 101, at S505, determines whether the detailed setting information on the video signal displayable by the LCD 100 was transmitted with regard to the resolution scheduled for output by the external device in S502. Specifically, in a case such as where the external device is connected but is still preparing transmission of a setting information request, the processing of advancing from S501 (No) to S503 (Yes), then from S306 (No) to S505 (No) and back to S501 is repeated. The CPU 101 shifts the processing to S307 if it is determined that the detailed setting information of the video signal displayable by the LCD 100 was transmitted with regard to the resolution scheduled for output, and returns the processing to S501 if this detailed setting information has not been transmitted.

If it is determined that a video signal was received from the connected external device at S306, the CPU 101 causes the signal processing unit 106 to analyze the received video signal at S309, and shifts the processing to S506 after obtaining information for determining whether the video signal is displayable by the LCD 100.

At S506, the CPU 101 determines whether the detailed setting information and the resolution of the received video signal correspond to a video signal displayable by the LCD 100. Specifically, the CPU 101 first determines, with regard to the resolution, whether the resolution of the received video signal obtained by the signal processing unit 106 is described in the first area and the second area of the EDID 400 in the EDID memory 104. Additionally, the CPU 101 determines whether the resolution of the received video signal is described as the resolution of a video signal displayable by the LCD 100 that is stored in the ROM 102 but could not be included in the EDID 400. Further, the CPU 101 determines, with regard to the detailed setting information, whether the detailed setting information for the received video signal matches the detailed setting information of a video signal displayable by the LCD 100. The CPU 101 shifts the processing to S312 if it is determined that the detailed setting information and the resolution of the received video signal correspond to a video signal displayable by the LCD 100, and returns the processing to S301 after executing error processing if this information does not correspond.

As a result of such video output processing and video display processing, the PC 200 decides on the resolution of the video signal that is scheduled for output, based on the EDID of the connected LCD 100, and generates the video signal after having obtained information for displaying a video signal of that resolution on the LCD 100. This enables a video signal that can be reliably displayed by the LCD 100 to be output from the PC 200 to the LCD 100.

As described above, with the video output apparatus of the present embodiment, a video signal displayable by a video display apparatus can readily be output from the video output apparatus. Also, the video output apparatus is able to generate a video signal after having received detailed conditions for enabling the video signal output to the video display apparatus to be displayed on the video display apparatus. That is, if the video output apparatus is capable of outputting a video signal compatible with the detailed conditions, the video display apparatus is able to receive a displayable video signal from the video output apparatus.

Other Embodiments

Aspects of the present invention can also be realized by a computer of a system or apparatus (or apparatuses such as a CPU or MPU) that reads out and executes a program recorded on a memory apparatus to perform the functions of the above-described embodiment(s), and by a method, the steps of that are performed by a computer of a system or apparatus by, for example, reading out and executing a program recorded on a memory apparatus to perform the functions of the above-described embodiment(s). For this purpose, the program is provided to the computer for example via a network or from a recording medium of various types serving as the memory apparatus (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-086753, filed Apr. 8, 2011 and 2012-

045787 filed Mar. 1, 2012, which are hereby incorporated by reference herein in their entirety.

What is claimed is:

1. A video display apparatus provided with a transmitting unit configured to transmit, to a video output apparatus, compatible video signal information including first information indicating a plurality of pixel numbers of video signal displayable by the video display apparatus and second information indicating detailed setting information required in order for the video output apparatus to generate video signal having one of the plurality of pixel numbers, comprising:
   a determining unit configured to determine whether a video signal received from the video output apparatus after the compatible video signal information is transmitted to the video output apparatus by the transmitting unit is a video signal having a pixel number displayable by the video display apparatus and being displayable by the video display apparatus; and
   an updating unit configured to update the second information of the compatible video signal information, in a case where it is determined by the determining unit that the video signal received from the video output apparatus is a video signal having a pixel number displayable by the video display apparatus and not being displayable by the video display apparatus, such that the detailed setting information for the pixel number of the video signal received from the video output apparatus is included in the second information,
   wherein the transmitting unit transmits the compatible video signal information updated by the updating unit to the video output apparatus.

2. The video display apparatus according to claim 1, wherein the updating unit updates the second information, in a case where the determining unit determines that the video signal received from the video output apparatus has a pixel number that the video display apparatus is displayable but is a video signal that the video display apparatus is not able to display, and where the pixel number of the video signal received from video output apparatus is included in the first information.

3. The video display apparatus according to claim 1, wherein the updating unit does not update the second information, in a case where the determining unit determines that the video signal received from the video output apparatus has a pixel number that the video display apparatus is displayable but is a video signal that the video display apparatus is not able to display, and where the detailed setting information for the pixel number of the video signal received from video output apparatus is included in the second information of the transmitted compatible video signal information.

4. The video display apparatus according to claim 1, wherein the detailed setting information includes information about at least one of video signal pixel clock, effective pixels, blanking, front porch, sync width, image size and interlacing.

5. The video display apparatus according to claim 1 further comprising a storing unit configured to store detailed setting information required in order for the video output apparatus to generate video signals which have the plurality of pixel numbers and are displayable by the video display apparatus,
   wherein the updating unit updates the second information with reference to the detailed setting information stored by the storing unit such that the second information includes the detailed setting information for the pixel number of the video signal received from the video output apparatus.

6. The video display apparatus according to claim 1 further comprising a notifying unit configured to make an error notification, in a case where the determining unit determines that the video signal received from the video output apparatus does not have a pixel number which is displayable by the video display apparatus.

7. The video display apparatus according to claim 1 further comprising a notifying unit configured to make an error notification, in a case where the determining unit determines that the video signal received from the video output apparatus has a pixel number that the video display apparatus is displayable but is a video signal that the video display apparatus is not able to display, and where the detailed setting information for the pixel number of the video signal received from video output apparatus is included in the second information of the transmitted compatible video signal information.

8. The video display apparatus according to claim 1, wherein
   the first information is information according to Standard Timing and Established Timing which are defined in EDID (Extended Display Identification Data), and
   the second information is information according to Detailed Timing which is defined in EDID.

9. A control method of a video display apparatus provided with a transmitting unit configured to transmit, to a video output apparatus, compatible video signal information including first information indicating a plurality of pixel numbers of video signals displayable by the video display apparatus and second information indicating detailed setting information required in order for the video output apparatus to generate video signal having one of the plurality of pixel numbers, comprising:
   a determining step of determining whether a video signal received from the video output apparatus after the compatible video signal information is transmitted to the video output apparatus by the transmitting unit is a video signal having a pixel number displayable by the video display apparatus and being displayable by the video display apparatus; and
   an updating step of updating the second information of the compatible video signal information, in a case where it is determined in the determining step that the video signal received from the video output apparatus is a video signal having a pixel number displayable by the video display apparatus and not being displayable by the video display apparatus, such that the detailed setting information for the pixel number of the video signal received from the video output apparatus is included in the second information,
   wherein the transmitting unit transmits the compatible video signal information updated in the updating step to the video output apparatus.

10. The control method according to claim 9, wherein the second information is updated in the updating step, in a case where it is determined in the determining step that the video signal received from the video output apparatus has a pixel number that the video display apparatus is displayable but is a video signal that the video display apparatus is not able to display, and where the pixel number of the video signal received from video output apparatus is included in the first information.

11. The control method according to claim 9, wherein the second information is not updated in the updating step, in a case where it is determined in the determining step that the video signal received from the video output apparatus has a pixel number that the video display apparatus is displayable but is a video signal that the video display apparatus is not able to display, and where the detailed setting information for the pixel number of the video signal received from video output apparatus is included in the second information of the transmitted compatible video signal information.

12. The control method according to claim 9, wherein the detailed setting information includes information about at least one of video signal pixel clock, effective pixels, blanking, front porch, sync width, image size and interlacing.

13. The control method according to claim 9 further comprising a storing step of storing detailed setting information required in order for the video output apparatus to generate video signals which have the plurality of pixel numbers and are displayable by the video display apparatus,
   wherein the second information is updated in the updating step with reference to the detailed setting information stored in the storing step such that the second information includes the detailed setting information for the pixel number of the video signal received from the video output apparatus.

14. The control method according to claim 9 further comprising a notifying step of making an error notification, in a case where it is determined in the determining step that the video signal received from the video output apparatus does not have a pixel number which is displayable by the video display apparatus.

15. The control method according to claim 9 further comprising a notifying step of making an error notification, in a case where it is determined in the determining step that the video signal received from the video output apparatus has a pixel number that the video display apparatus is displayable but is a video signal that the video display apparatus is not able to display, and where the detailed setting information for the pixel number of the video signal received from video output apparatus is included in the second information of the transmitted compatible video signal information.

16. The control method according to claim 9, wherein
   the first information is information according to Standard Timing and Established Timing which are defined in EDID (Extended Display Identification Data), and
   the second information is information according to Detailed Timing which is defined in EDID.

* * * * *